United States Patent
Peng

(10) Patent No.: US 9,322,997 B2
(45) Date of Patent: Apr. 26, 2016

(54) BRANCHED WAVEGUIDE CONFIGURATION

(71) Applicant: Seagate Technology LLC, Cupertino, CA (US)

(72) Inventor: Chubing Peng, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 213 days.

(21) Appl. No.: 14/225,150

(22) Filed: Mar. 25, 2014

(65) Prior Publication Data
US 2015/0279394 A1 Oct. 1, 2015

(51) Int. Cl.
| | |
|---|---|
| G11B 5/31 | (2006.01) |
| G11B 11/00 | (2006.01) |
| G02B 6/26 | (2006.01) |
| G02B 6/14 | (2006.01) |
| G11B 5/60 | (2006.01) |
| G11B 5/00 | (2006.01) |

(52) U.S. Cl.
CPC .................. *G02B 6/14* (2013.01); *G11B 5/314* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,127,081 A | 6/1992 | Koren et al. | |
| 5,373,575 A | 12/1994 | Yamamoto et al. | |
| 5,479,551 A | 12/1995 | DiGiovanni et al. | |
| 8,078,021 B2 | 12/2011 | Ushida | |
| 8,085,473 B2 | 12/2011 | Itagi et al. | |
| 8,248,891 B2 | 8/2012 | Lee at al. | |
| 8,307,540 B1 | 11/2012 | Tran et al. | |
| 8,385,183 B2 | 2/2013 | Peng et al. | |
| 8,565,049 B1 | 10/2013 | Tanner et al. | |
| 8,670,294 B1 | 3/2014 | Shi et al. | |
| 9,053,716 B1 * | 6/2015 | Matsumoto | G11B 5/314 |
| 2008/0204916 A1 * | 8/2008 | Matsumoto | G11B 5/314 360/59 |
| 2010/0188768 A1 | 7/2010 | Itagi | |
| 2010/0271910 A1 | 10/2010 | Boutaghou | |
| 2010/0284252 A1 | 11/2010 | Hirata et al. | |
| 2011/0170381 A1 | 7/2011 | Matsumoto | |
| 2011/0181979 A1 | 7/2011 | Jin et al. | |
| 2011/0205660 A1 * | 8/2011 | Komura | B82Y 20/00 360/59 |
| 2013/0223196 A1 | 8/2013 | Gao et al. | |
| 2014/0036646 A1 | 2/2014 | Peng et al. | |

OTHER PUBLICATIONS

File History for U.S. Appl. No. 14/078,280.
Yajima, Hiroyoshi, "Dielectric thin-film optical branching waveguide", Appln. Phys. Lett. 22, 647, 649 (1973).

(Continued)

*Primary Examiner* — Hemang Sanghavi
(74) *Attorney, Agent, or Firm* — Hollingsworth Davis, LLC

(57) ABSTRACT

An apparatus including a waveguide input coupler, a tapered branch waveguide, and a waveguide adaptor physically connected to the waveguide input coupler proximal end and to the branch waveguide proximal end. The waveguide input coupler includes a distal end having a distal end width and a proximal end having a proximal end width. The tapered branch waveguide includes a distal end having a distal end width and a proximal end having a proximal end width, the branch waveguide distal end width being greater than the branch waveguide proximal end width. The waveguide input coupler, the branch waveguide, and the waveguide adapter are configured to convert input light having a base transverse waveguide mode to output light having a higher-order waveguide mode.

23 Claims, 6 Drawing Sheets

(56) References Cited

OTHER PUBLICATIONS

Ramadan et al. "Adiabatic Couplers: Desigb Rules and Optimization", Journal of Lightwave Technology 16, 277, 283 (1998).

Huang, Wei-Ping, "Coupled-mode theory for optical waveguides: an overview" J. Opt. Soc. Am. A11, No. 3, 963 983 (1994).

Apr. 28, 2015, File History for U.S. Appl. No. 14/078,280.

\* cited by examiner

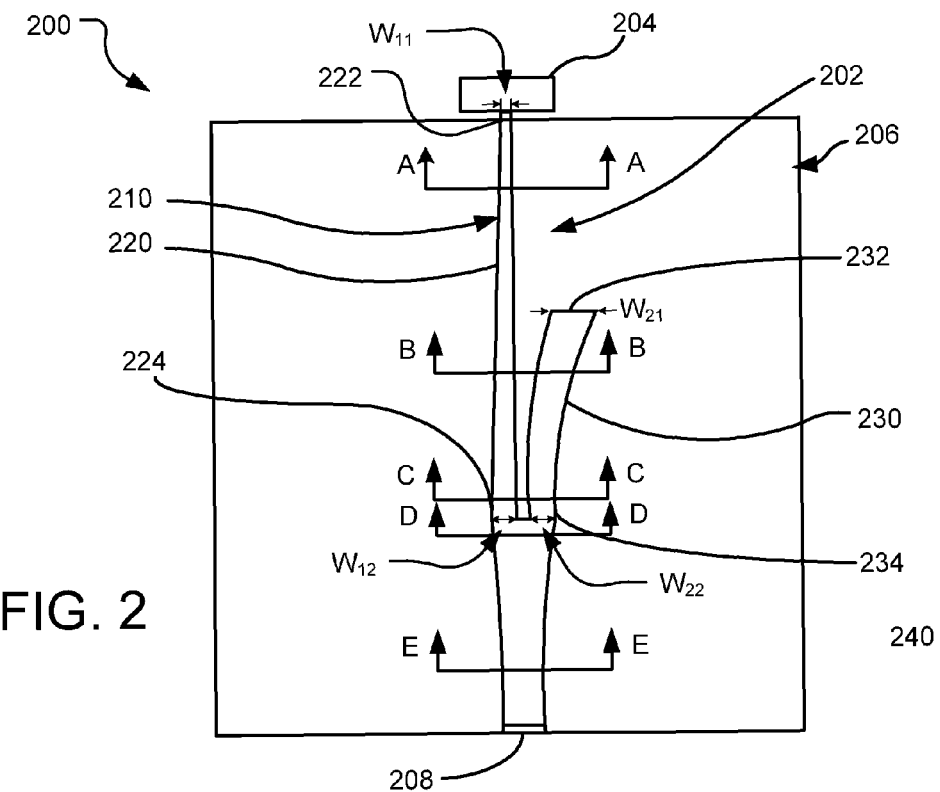
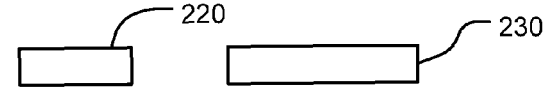
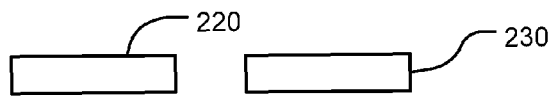
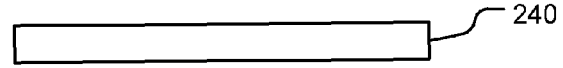
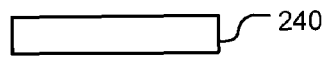
FIG. 2
FIG. 2A
FIG. 2B
FIG. 2C
FIG. 2D
FIG. 2E

BRANCHED WAVEGUIDE CONFIGURATION

BACKGROUND

A heat-assisted, magnetic recording (HAMR) data storage medium uses a high magnetic coercivity material that is able to resist superparamagnetic effects (e.g., thermally-induced, random, changes in magnetic orientations) that currently limit the areal data density of conventional hard drive media. In a HAMR device, a small portion or "hot spot" of the magnetic medium is locally heated to its Curie temperature, thereby allowing the magnetic orientation of the medium to be changed at the hot spot and thus be written to by a transducer. After the heat is removed, the region maintains its magnetic state, thereby reliably storing the data for later retrieval.

SUMMARY

The present disclosure is directed to light delivery systems suitable for use in, for example, HAMR devices.

One particular implementation of this disclosure is an apparatus having a waveguide input coupler including a distal end having a distal end width and a proximal end having a proximal end width, a tapered branch waveguide including a distal end having a distal end width and a proximal end having a proximal end width, the branch waveguide distal end width being greater than the branch waveguide proximal end width, and a waveguide adaptor physically connected to the waveguide input coupler proximal end and to the branch waveguide proximal end. The waveguide input coupler, the branch waveguide, and the waveguide adapter are configured to convert input light having a base transverse waveguide mode to output light having a higher-order waveguide mode.

Another particular implementation of this disclosure is an apparatus including a waveguide input coupler including a proximal end having a proximal end width, the waveguide input coupler configured to receive light having a first transverse waveguide mode, a branch waveguide including a distal end having a distal end width and a proximal end having a proximal end width, the branch waveguide distal end width being greater than the branch waveguide proximal end width, and a waveguide adaptor operably connected to the waveguide input coupler proximal end and to the branch waveguide proximal end, wherein the waveguide input coupler, the branch waveguide, and the waveguide adapter are configured to prevent excitation of the light at the first waveguide mode.

Yet another particular implementation of this disclosure is a method that includes coupling light having a first transverse waveguide mode into a waveguide input coupler, converting the light having the first waveguide mode into light having a higher-order waveguide mode via the waveguide input coupler and a tapered branch waveguide physically spaced from the waveguide input coupler, and outputting the light having the higher-order waveguide mode from a waveguide adapter connected to the waveguide input coupler and to the tapered branch waveguide.

These and various other features and advantages will be apparent from a reading of the following detailed description.

BRIEF DESCRIPTION OF THE DRAWING

FIG. 2 schematically illustrates an example light delivery system for a near-field-transducer-aligned light source; FIG. 2A is a cross-sectional view taken along line A-A; FIG. 2B is a cross-sectional view taken along line B-B; FIG. 2C is a cross-sectional view taken along line C-C; FIG. 2D is a cross-sectional view taken along line D-D; FIG. 2E is a cross-sectional view taken along line E-E.

DETAILED DESCRIPTION

The present description is directed to a waveguide configuration that converts light, provided at a base or normal waveguide mode to a higher-order waveguide mode; the waveguide mode may be, for example, transverse electric (TE) or transverse magnetic (TM). The waveguide configuration includes a first or primary waveguide input coupler and a second, tapering branch waveguide that join at a waveguide adapter. The tapering branch waveguide width controls the mode conversion (e.g., from $TE_{00}$ waveguide mode to $TE_{10}$ waveguide mode, or, e.g., from $TM_{00}$ waveguide mode to $TM_{10}$ waveguide mode). Additionally, by tapering the waveguide input coupler, the input coupler couples light from the light source and also cancels some mode conversion. Additionally, when the end width of the branch waveguide is equal to or close to equal to the end width of the waveguide input coupler, excitation of the fundamental mode in the waveguide adapter is minimized and, in some implementations, prevented.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present invention. The following detailed description, therefore, is not to be taken in a limiting sense. While the present invention is not so limited, an appreciation of various aspects of the invention will be gained through a discussion of the examples provided below.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Implementations of the technology described herein may be employed in the context of a data storage system, although other applications may also be contemplated for light delivery using such technology.

Figure 1:
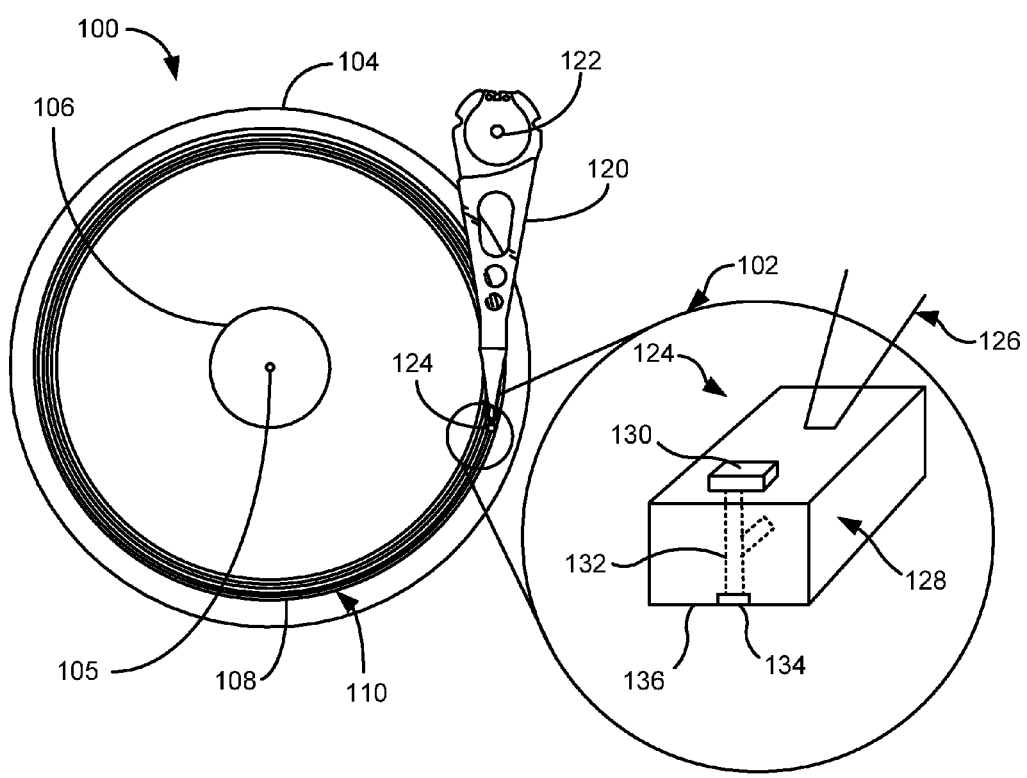
FIG. 1 is a top view of a data storage device having an example light delivery system called out.

FIG. 1 illustrates a data storage device 100 having an example light delivery system, shown in more detail in an exploded view 102. Although other implementations are contemplated, in the illustrated implementation, data storage device 100 includes a storage medium 104 (e.g., a magnetic data storage disc) on which data bits can be recorded using a magnetic write pole and from which data bits can be read using a magnetoresistive element. Storage medium 104 rotates about a spindle center or a disc axis of rotation 105 during rotation, and includes an inner diameter 106 and an outer diameter 108 between which are a number of concentric data tracks 110. It should be understood that the described technology may be used with a variety of storage formats, including continuous magnetic media, discrete track (DT) media, shingled media, etc.

Information may be written to and read from data bit locations in the data tracks on storage medium 104. An actuator assembly 120, having an actuator axis of rotation 122, supports a transducer head assembly 124 at a distal end thereof via suspension 126. Transducer head assembly 124 'flies' in close proximity above the surface of storage medium 104 during disc rotation. Actuator assembly 120 rotates during a 'seek' operation about the actuator axis of rotation 122. The seek operation positions transducer head assembly 124 over a target data track for read and write operations.

In an implementation employing Heat-Assisted-Magnetic-Recording (HAMR), the recording action is assisted by a heat source applied to a bit location on storage medium 104. The data bits (e.g., user data bits, servo bits, etc.) are stored in very small magnetic grains embedded within layers of storage medium 104. The data bits are recorded in the magnetic grains within tracks 110 on the storage medium.

Generally, HAMR technology employs a storage medium (such as the storage medium 104) having a very high magnetic anisotropy, which contributes to thermal stability of the magnetization of the small magnetic grains in the storage medium 104. By temporarily heating storage medium 104 during the recording process, the magnetic coercivity of the magnetic grains can be selectively lowered below an applied magnetic write field in a tightly focused area of storage medium 104 that substantially corresponds to an individual data bit. The heated region is then rapidly cooled in the presence of the applied magnetic write field, which encodes the recorded data bit in the heated region based on the polarity of the applied magnetic write field. After cooling, the magnetic coercivity substantially returns to its pre-heating level, thereby stabilizing the magnetization for that bit. This write process is repeated for multiple data bits on storage medium 104, and such data bits can be read using a magnetoresistive read head.

The exploded view 102 in FIG. 1 schematically illustrates a perspective view of the transducer head assembly 124, the primary face being the down-track, or trailing edge, side of assembly 124. Transducer head assembly 124 is supported by suspension 126 extending from the arm of actuator assembly 120. In the implementation illustrated in the exploded view 102, transducer head assembly 124 includes, among other features, a slider 128, a light source 130 (e.g., a laser), a waveguide configuration 132, and a plasmonic transducer 134, such as a near-field-transducer (NFT). An air-bearing surface (ABS) 136 of slider 128 'flies' across the surface of storage medium 104 as medium 104 rotates, reading and writing data bits from and to the magnetic grains in the surface of storage medium 104.

Light source 130 directs light into waveguide configuration 132, which has a high contrast in the refractive index between the waveguide core and its cladding. The light propagating through waveguide configuration 132 is focused into near-field transducer (NFT) 134. Near field optics (in NFT 134) make use of apertures and/or antennas to cause a thermal increase in the data bit location on the surface of storage medium 104 (e.g., via surface plasmon effects). As a result, the data bit location on the surface is heated, selectively reducing the magnetic coercivity of the magnetic grains at the data bit location, relative to other areas of the surface. Accordingly, a magnetic field applied to the heated data bit location (as it cools) is sufficient to record a data bit at the location without disturbing data bits in adjacent, non-heated bit locations. In one implementation, the magnetic field is supplied to a write pole positioned in the near proximity of NFT 134. In this manner, the heating area can substantially determine the writable area (e.g., the data bit dimension).

There are various methods of launching light into a slider, e.g., slider 128. In one implementation, free space light delivery involves directing light from free space to a grating coupler fabricated in a slider. In the implementation shown in FIG. 1, light source 130, such as a laser diode, is butt-coupled to waveguide configuration 132; such an implementation is referred to as laser-on-slider light delivery. Another configuration, called laser-in-slider light delivery, also employs butt coupling, although other methods of light delivery may be employed.

Light delivered by light source 130 usually has a normal or base waveguide mode. For certain systems, a $\pi$ (pi) phase shifted higher-order mode is preferred. Waveguide configuration 132 converts the light to a higher-order waveguide mode.

In some implementations, light delivered by light source 130 has a normal or base transverse electric (TE) waveguide mode, $TE_{00}$. Waveguide configuration 132 converts the light to a higher-order transverse electric (TE) waveguide mode, such as $TE_{10}$, which is the first higher-order waveguide mode. Additionally or alternately, light delivered by light source 130 has a normal or base transverse magnetic (TM) waveguide mode, $TM_{00}$. Waveguide configuration 132 converts the light to a higher-order transverse magnetic (TM) waveguide mode, such as $TM_{10}$, which is the first higher-order waveguide mode.

FIG. 2 illustrates an example implementation of a transducer head assembly 200 having a light delivery system 202 for a near-field-transducer-aligned light source. As shown, a light delivery source, in this implementation a laser diode 204, is affixed on a slider 206. Light emitted from laser diode 204 is delivered onto an NFT 208 by waveguide configuration 210. NFT 208 causes heating at a bit location in the storage medium 104 (FIG. 1) such as via surface plasmon effects. Waveguide configuration 210 composed of a first or primary waveguide identified as waveguide input coupler 220, a second or secondary waveguide identified as branch waveguide 230, and a waveguide adaptor 240.

In the illustrated figure, waveguide configuration 210 couples light from laser diode 204, which has a normal or base transverse electric (TE) waveguide mode $TE_{00}$, and converts the light to a higher-order transverse electric (TE) waveguide mode, such as $TE_{10}$. The fundamental mode, $TE_{00}$, from laser diode 204 is converted by waveguide input coupler 220 into the first higher-order mode, $TE_{10}$, with the assistance of branch waveguide 230. Waveguide adapter 240 is optimized for NFT excitation efficiency, so that NFT 208 is thus excited by $TE_{10}$ waveguide mode light. In some implementations, waveguide configuration 210 converts normal or base transverse magnetic (TM) waveguide mode $TM_{00}$ light to a higher-order transverse magnetic (TM) waveguide mode, such as $TM_{10}$.

Because waveguide configuration 210 is composed of two waveguides (i.e., waveguide input coupler 220 and branch waveguide 230), there are two system modes, often called normal modes, for the output light if the two waveguide structures do not vary in the direction of propagation; one of the normal modes has a symmetric-like (or even) spatial profile and the other one an asymmetric-like (or odd) spatial profile. If the two waveguides are dissimilar and well separated, as in the implementation illustrated in FIG. 2, the field of the symmetric-like (asymmetric-like) normal mode is mainly located in the waveguide of larger (smaller) propagation constant. If light is input from the waveguide of lower propagation constant and the transition of the two waveguide structures along propagation direction is sufficiently slow (often referred to as "adiabatic"), only the odd normal mode will be excited in the coupled system, which eventually forms the $TE_{10}$ or $TM_{10}$ waveguide mode. In some implementations, it is desired to design an adiabatic coupler/splitter to minimize the conversion between the two normal modes.

Waveguide input coupler 220 has a first end 222 and a second opposite end 224. First end 222 is referred to herein as the distal end, as it is distal from NFT 208 and storage medium 104 (FIG. 1), and second end 224 is referred to herein as the proximal end, as it is proximal to NFT 208 and storage medium 104 (FIG. 1). Waveguide input coupler 220 has a width along its entire length, in this illustrated implementation, reverse tapering from distal end 222 to proximal end 224; that is, proximal end 224 is wider than distal end 222. The width of distal end 222 is identified as $W_{11}$ and the width of proximal end 224 is identified as $W_{12}$.

Similarly, branch waveguide 230 has a first end 232 and a second opposite end 234. First end 232 is referred to herein as the distal end, as it is distal from NFT 208 and storage medium 104 (FIG. 1), and second end 234 is referred to herein as the proximal end, as it is proximal to NFT 208 and storage medium 104 (FIG. 1). Branch waveguide 230 has a width along its entire length, in this illustrated implementation, tapering from distal end 232 to proximal end 234. The width of distal end 232 is identified as $W_{21}$ and the width of proximal end 234 is identified as $W_{22}$.

Positioned operably between waveguide input coupler 220 and branch waveguide 230 and NFT 208 is waveguide adaptor 240. In this implementation of FIG. 2, waveguide adaptor 240 extends from waveguide input coupler proximal end 224 and from branch waveguide proximal end 234 to NFT 208.

Waveguide input coupler 220 is butt coupled to laser diode 204 at its distal end 222 and physically connected to waveguide adaptor 240 at its proximal end 224. Branch waveguide 230 is also physically connected to waveguide adaptor 240 at its proximal end 234. Waveguide input coupler 220 and branch waveguide 230 are spaced from each other for at least a portion of their overlapping length; that is, for at least a portion of their overlapping length, waveguide input coupler 220 and branch waveguide 230 are physically separated from each other. In the implementation illustrated in FIG. 2, waveguide input coupler 220 and branch waveguide 230 have a varying space or distance therebetween; that is, the distance between waveguide input coupler 220 and branch waveguide 230 varies along the lengths of waveguide input coupler 220 and branch waveguide 230. In one implementation, the distance between waveguide input coupler distal end 222 and branch waveguide distal end 232 is greater than the distance between waveguide input coupler proximal end 224 and branch waveguide proximal end 234. Also in the implementation illustrated in FIG. 2, waveguide input coupler 220 and branch waveguide 230 are spaced from each other their entire length, including at waveguide input coupler proximal end 224 and branch waveguide proximal end 234. In other implementations, waveguide input coupler proximal end 224 and branch waveguide proximal end 234 have no or minimal space therebetween.

FIGS. 2A through 2E are cross-sectional views taken along various locations of waveguide configuration 210 between laser diode 204 and NFT 208 illustrating the relative widths of waveguide input coupler 220, branch waveguide 230 and waveguide adaptor 240, and the distance between waveguide input coupler 220 and branch waveguide 230.

At the location of cross-sectional line A-A, only waveguide input coupler 220 is present, as seen in FIG. 2A. As one progresses away from laser diode 204, branch waveguide 230 begins. At cross-sectional line B-B, as seen in FIG. 2B, both waveguide input coupler 220 and branch waveguide 230 are present, with branch waveguide 230 have a greater width at this location than waveguide input coupler 220. At line C-C, distal to where waveguide input coupler proximal end 224 and branch waveguide proximal end 234 join waveguide adaptor 240, waveguide input coupler proximal end 224 and branch waveguide proximal end 234 have essentially the same width $W_{12}$ and $W_{22}$ and a lesser spacing therebetween than at line B-B, as seen in FIG. 2C. In FIG. 2D at line D-D, proximal to where waveguide input coupler proximal end 224 and branch waveguide proximal end 234 join waveguide adaptor 240, waveguide adaptor 240 has a width that is greater than the combined widths $W_{12}$ and $W_{22}$ of waveguide input coupler proximal end 224 and branch waveguide proximal end 234. Additionally, the width of waveguide adaptor 240 is nearly equal to or greater than the combined widths $W_{12}$ and $W_{22}$ of waveguide input coupler proximal end 224 and branch waveguide proximal end 234 and the gap therebetween. It can be seen in FIG. 2E that, for this implementation, the width of waveguide adaptor 240 has decreased at line E-E, although in other implementations could be the same or increase, since adaptor 240 is designed to optimize NFT 208 efficiency.

Together, waveguide input coupler 220, branch waveguide 230 and waveguide adaptor 240 provide output light to NFT 208 that has a higher-order TE or TM waveguide mode (e.g., $TE_{10}$ or $TM_{10}$) than provided by laser diode 204 (i.e., $TM_{00}$ or $TE_{00}$). Additionally, in some implementations, waveguide input coupler 220, branch waveguide 230, and waveguide adapter 240 together at least minimize, and preferably prevent, excitation of the fundamental waveguide input light.

In general, branch waveguide 230 has a wider cross-section width at its distal end 232 than at its proximal end 234 and is well separated from waveguide input coupler 220 at branch waveguide distal end 232. With such a construction, only the odd normal mode is dominantly excited. Additionally, both waveguide input coupler 220 and branch waveguide 230 are sized and shaped (along their width) to support only fundamental transverse mode. As the two waveguides (e.g., waveguide input coupler 220 and branch waveguide 230) are brought together slowly (i.e., the distance between waveguide input coupler 220 and branch waveguide 230 decreases from their distal ends 222, 232 to their proximal ends 224, 234), the light field from laser diode 204 via waveguide input coupler 220 is gradually coupled into branch waveguide 230. At their proximal ends 224, 234, waveguide input coupler 220 and branch waveguide 230 are combined at waveguide adaptor 240, which supports two modes, the fundamental waveguide mode and a higher-order waveguide mode, such as $TE_{10}$ or $TM_{10}$.

In some implementations, to efficiently excite the higher-order waveguide mode in waveguide adaptor 240, waveguide input coupler proximal end 224 and branch waveguide proximal end 234 have nearly equal width at adaptor coupler 240 (i.e., $W_{12}$ is close to equal to or is equal to $W_{22}$). Further, to maximize the mode overlap between the local odd normal mode at waveguide input coupler proximal end 224 with the $TE_{10}$ or $TM_{10}$ mode of waveguide adaptor 240, the width of waveguide adaptor 240 is optimized, which is usually slightly wider than the sum of the width $W_{12}$ of waveguide input coupler proximal end 224, the gap between waveguide input coupler proximal end 224 and branch waveguide proximal end 234, and branch waveguide proximal end width $W_{22}$. The gap between the input coupler and branch waveguide is a compromise of fabrication capability, the interaction between the two waveguides (e.g., waveguide input coupler 220 and branch waveguide 230), and scattering/radiation loss transiting from waveguide input coupler 220 to joined adaptor 240. In addition, the shape of branch waveguide 230 is chosen such that the separation between two waveguides near the proximal ends 224, 234 decreases slowly, which minimizes any wave-front tilting effect.

Figure 3:
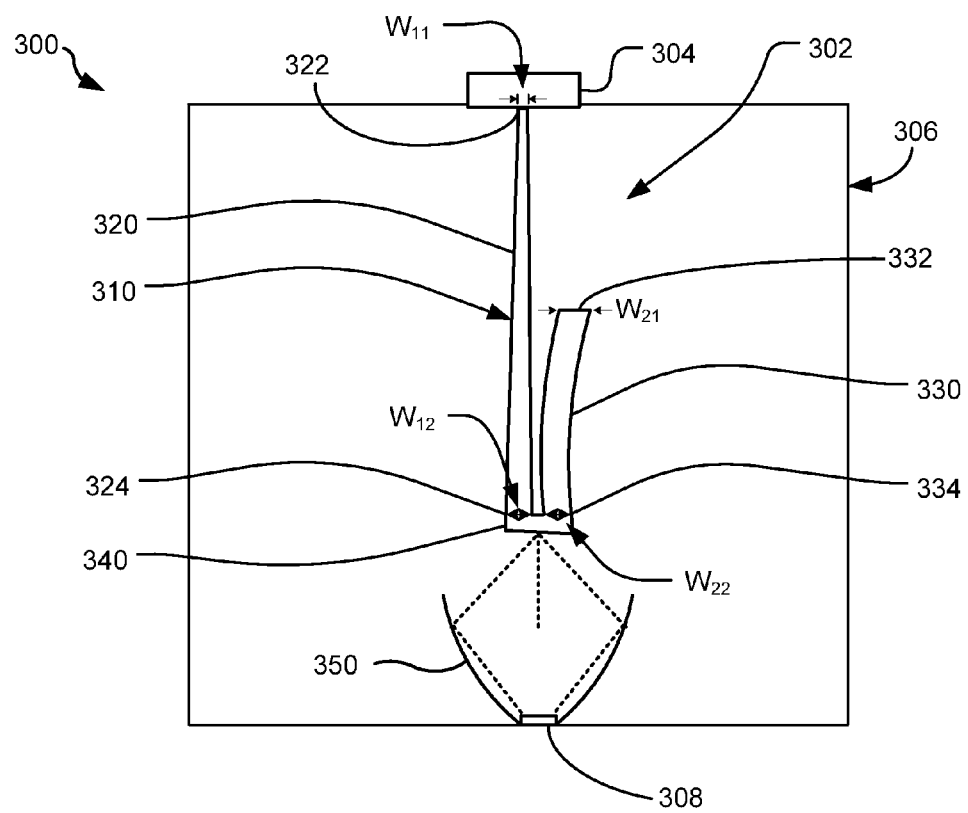
FIG. 3 schematically illustrates another example light delivery system for a near-field-transducer-aligned light source.

FIG. 3 illustrates another implementation of a transducer head assembly 300 having a light delivery system 302 for a near-field-transducer-aligned light source (such as a laser diode 304) affixed on a slider 306. Light emitted from laser diode 304 is coupled by light delivery system 302 and focused to an NFT 308. Unless indicated otherwise, like features in the implementation of FIG. 3 are the same or similar to those same features in the implementation of FIG. 2.

As in FIG. 2, light delivery system 302 of FIG. 3 has a waveguide configuration 310 composed of a waveguide input coupler 320 and a branch waveguide 330. Waveguide input coupler 320 includes a distal end 322 having a width $W_{11}$ and an opposite proximal end 324 having a width $W_{12}$. Branch waveguide 330 includes a distal end 332 having a width $W_{21}$ and a proximal end 334 having a width $W_{22}$. The overall shape and configuration of waveguide input coupler 320 and branch waveguide 330 are the same as waveguide input coupler 220 and branch waveguide 230 from FIG. 2.

Positioned between waveguide input coupler 320 and branch waveguide 330 and NFT 308 is a waveguide adaptor 340. In this implementation, however, positioned between waveguide adaptor 340 and NFT 308 is a solid immersion mirror (SIM) 350. In the illustrated implementation, the shape of SIM 350 is elliptical or substantially parabolic, although various shapes may be used. In some implementations, a beam expander can be attached at the end of waveguide adapter 340 to efficiently excite NFT 308. Together, input coupler 320, branch waveguide 330, waveguide adaptor 340, and SIM 350 focus light to NFT 308 such that the central focused spot is longitudinally polarized.

Figure 4:
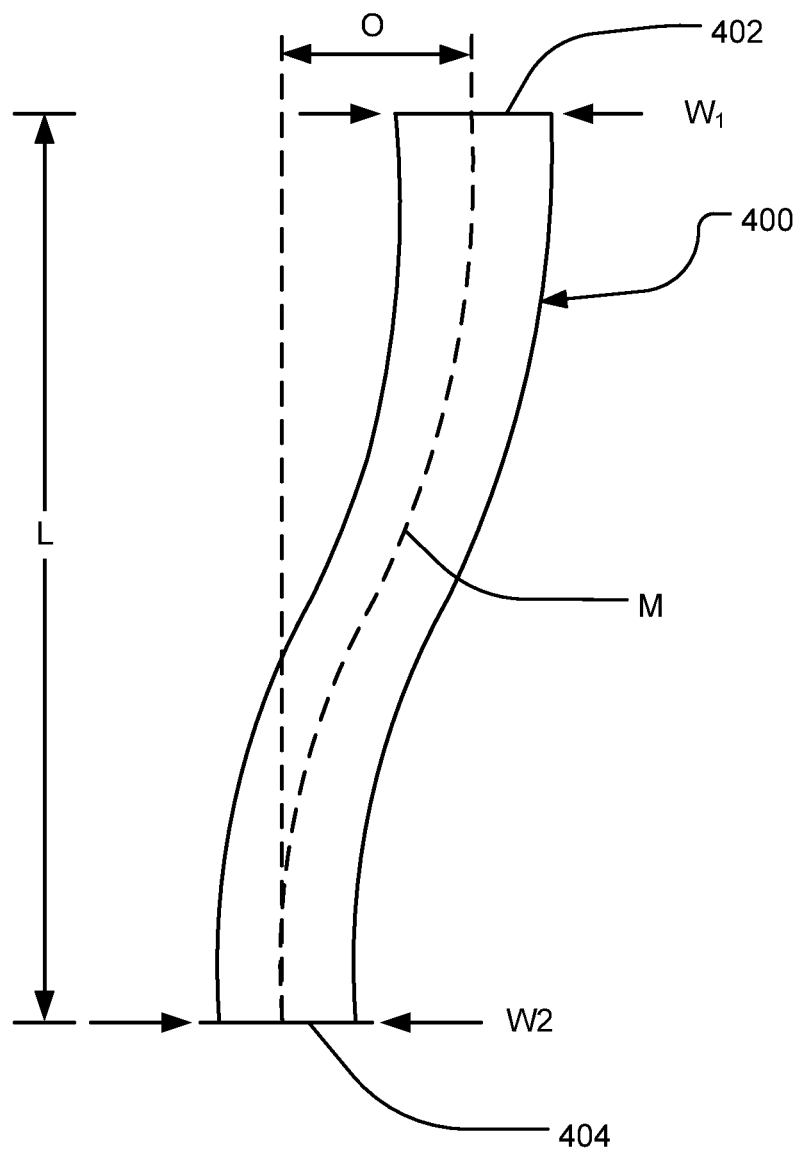
FIG. 4 schematically illustrates an example branch waveguide from a light delivery system.

FIG. 4 shows an implementation of a tapered branch waveguide, particularly, branch waveguide 400. Branch waveguide 400 includes a distal end 402 having a distal end width $W_1$, a proximal end 404 having a proximal end width $W_2$, and a nominal length L from distal end 402 to proximal end 404. Branch waveguide 400 has a middle line M. Branch waveguide 400 tapers from distal end 402 to proximal end 404; that is, distal end width $W_1$ is greater than proximal end width $W_2$. In some embodiments, this taper or decrease from distal end 402 to proximal end 404 is defined by a linear function. Alternately, the rate of taper or decrease may vary along the length L, from distal end 402 to proximal end 404.

Branch waveguide 400 is illustrated having a non-linear, curving shape, although in other implementations it could be linear or straight. Because of the tapering nature of branch waveguide 400, its shape can readily be defined by the curvature (or linearity) of its middle line M. A linear branch waveguide would have a linear middle line M, even if the overall width of the branch waveguide tapers from its distal end to its proximal end. A non-linear branch waveguide will have middle line M being non-linear, e.g., concave in relation to the waveguide input coupler, convex in relation to the waveguide input coupler, or may be a combination of various arcuate sections. Numerical modeling, detailed below, shows that a cosine-like shape is a suitable choice for a branch waveguide.

Following coupled mode theory, the differential equations describing the coupling between the two local normal modes may be written as $$\frac{dW}{dz} = jBW - NW \tag{1a}$$

with $$W = \begin{pmatrix} A_s \\ A_a \end{pmatrix} \quad B = \begin{pmatrix} \beta_s & 0 \\ 0 & \beta_a \end{pmatrix} \tag{1b}$$

where $A_s$ ($A_a$) denotes the complex amplitude of the local symmetric-like (asymmetric-like) normal mode at propagation z, and $\beta_s$ ($\beta_a$) stands for the propagation constant of the local symmetric-like (asymmetric-like) normal mode. N is a matrix and its off-diagonal elements describe the coupling between two local normal modes. If wavefront tilting and waveguide tapering are neglected, N may be written as $$N = \begin{pmatrix} 0 & N_{12} \\ N_{21} & 0 \end{pmatrix} \quad N_{12} = -N_{21} \tag{1c}$$

To obtain an approximate solution to the above coupled equations, reduced amplitudes $a_s$ and $a_a$ are considered, such that the propagation phase is removed from $A_s$ and $A_a$ respectively $$a_s(z) = A_s(z)\exp\left[-j\int_{z_0}^{z}\beta_s dz'\right] \tag{2a}$$

$$a_a(z) = A_a(z)\exp\left[-j\int_{z_0}^{z}\beta_a dz'\right] \tag{2b}$$

The coupled equations, Eqs. (1a), (1b), (1c) become $$\frac{da_s}{dz} = -N_{12}a_a\exp(-ju) \tag{3a}$$

$$\frac{da_a}{dz} = -N_{21}a_s\exp(ju) \tag{3b}$$

with $$u = \int_{z_0}^{z}(\beta_s - \beta_a)dz' \tag{3c}$$

where u is the integral of the propagation phase difference between the two normal mode, and $z_0$ denotes the z coordinate where the branch waveguide starts. For adiabatic waveguide coupler and splitter, the coupling between two normal modes is usually weak. To the second order of the coupling, an approximate solution to Eqs. (2a), (2b) is derived:

$$a_s(z) \approx a_s(z_0) + a_a(z_0)\int_{z_0}^{z}(-N_{12})\exp(-ju)dz' + \quad (4a)$$
$$a_s(z_0)\int_{z_0}^{z}(-N_{12})\exp(-ju)\left[\int_{z_0}^{z'}(-N_{21})\exp(ju)dz''\right]dz'$$

$$a_a(z) \approx a_a(z_0) + a_s(z_0)\int_{z_0}^{z}(-N_{21})\exp(ju)dz' + \quad (4b)$$
$$a_a(z_0)\int_{z_0}^{z}(-N_{21})\exp(ju)\left[\int_{z_0}^{z'}(-N_{12})\exp(-ju)dz''\right]dz'$$

For $TE_{00}$ to $TE_{10}$ mode order converter, $a_s(z_0) \approx 0$, $a_a(z_0) \approx 1$, $$a_s(z) \approx \int_{z_0}^{z}(-N_{12})\exp(-ju)dz' \quad (5)$$

The goal of designing a mode order converter is to minimize the conversion between the two normal modes, i.e., to minimize the even mode amplitude, $a_s$. The idea is to have fast oscillations in the phase term, $\exp(-j\,u)$, such that the conversion is cancelled, by making ($\beta_s$-$\beta_a$) (i.e., the difference in propagation constant between the two normal modes) as large as possible at every z. To deeply understand Eq. (5), orthogonal coupled mode theory is used, which neglects the end-fire coupling between two waveguides. The normal mode coupling coefficient $N_{12}$ and propagation constant difference ($\beta_s$-$\beta_a$) are approximated as $$N_{12} = \frac{1}{2(1+X^2)}\frac{dX}{dz} \quad (6a)$$

$$\Delta\beta_{sa} \equiv \beta_s - \beta_a = 2|k|\sqrt{1+X^2} \quad (6b)$$

with:

$$X = \frac{\Delta\beta}{2k} \quad (7a)$$

$$\Delta\beta = \beta_1 - \beta_2 \quad (7b)$$

Here $\beta_1$ and $\beta_2$ denote the propagation constants of the two isolated waveguides, i.e., the branch waveguide and the input waveguide coupler, respectively. k is the average coupling coefficient between two waveguides.

For the adiabatic mode order converter, $N_{12}$ and $\Delta\beta_{sa}$ are usually a slowly varying function of propagation z. Eq. (5) is further approximated as $$a_s(z) \approx (-N_{12})\frac{2\sin[\Delta\beta_{sa}(z-z_0)/2]}{\Delta\beta_{sa}}e^{-j\Delta\beta_{sa}(z-z_0)/2} \quad (8)$$

From Eq. (8) the maximum mode conversion from this inequality is found:

$$|a_s(z)| \leq \frac{2(-N_{12})}{\Delta\beta_{sa}} \equiv |a_s(z)|_{max} \quad (9)$$

Substituting Eq. (9) with Eqs. (6a) and (6b), obtains Eq. (10), which lays the foundation for designing a short mode order converter $$|a_s(z)|_{max} = \left[\frac{1}{2k}\frac{1}{(1+X^2)^{3/2}}\right]\left(-\frac{dX}{dZ}\right) \quad (10)$$

Figure 5A:
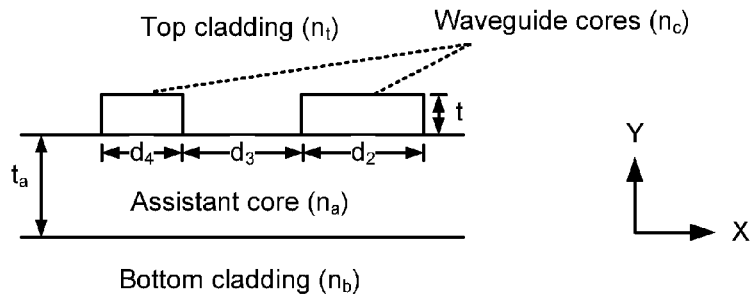
FIG. 5A is a schematic two-dimensional view of rectangular-core waveguides.
Figure 5B:
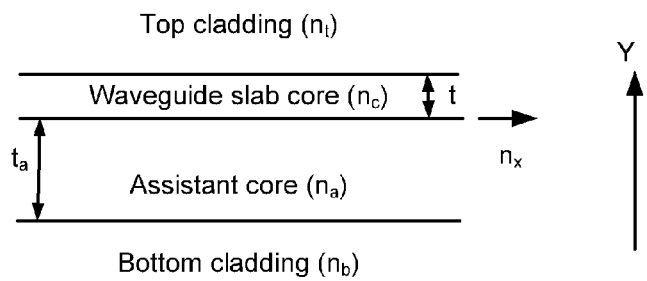
FIG. 5B is a schematic one-dimensional view of a single slab construction for waveguides, viewed in the X-direction of FIG. 5A.
Figure 5C:
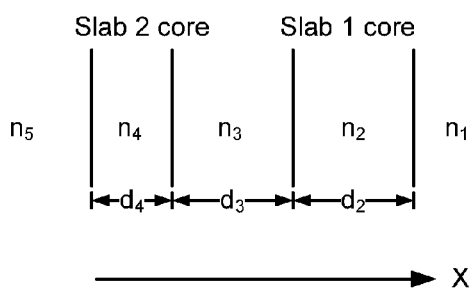
FIG. 5C is a schematic one-dimensional view of a single slab construction for waveguides, viewed in the Y-direction of FIG. 5A.

To obtain the coupling coefficient k and the propagation constants $\beta_1$ and $\beta_2$, an effective-index method is used; the steps in applying the effective-index method to the general waveguide coupler illustrated in FIG. 5A are illustrated in FIG. 5B and FIG. 5C. The mode index of the $TE_0$ mode (the mode index is defined as the propagation constant divided by the free-space wave-number) is first calculated from the slab of thickness t and forms the effective refractive index $n_x$. The propagation constant of $TM_0$ ($TM_1$) mode of the composite waveguide formed by these two parallel slabs of thicknesses $d_2$ and $d_4$, separated by $d_3$, as shown in FIG. 5C, is then used to approximate the propagation constant of the symmetric-like (asymmetric-like) TE normal mode of the original two-dimensional coupler, and the coupling between two slabs is also used to approximate the coupling of the original two-dimensional coupler.

The coupling coefficients between two slabs are defined as $$k_{12} = \frac{\omega\varepsilon_0}{4P_1} \quad (11a)$$
$$\left[\int_{d_3+\frac{d_4}{2}}^{d_3+\frac{d_4}{2}+d_2}(n_2^2-n_3^2)\vec{E}_1\cdot\vec{E}_2 dx + \int_{d_3+\frac{d_4}{2}+d_2}^{\infty}(n_1^2-n_3^2)\vec{E}_1\cdot\vec{E}_2 dx\right]$$

$$k_{21} = \frac{\omega\varepsilon_0}{4P_2}\left[\int_{-\infty}^{-\frac{d_4}{2}}(n_5^2-n_3^2)\vec{E}_1\cdot\vec{E}_2 dx + \int_{-\frac{d_4}{2}}^{\frac{d_4}{2}}(n_4^2-n_3^2)\vec{E}_1\cdot\vec{E}_2 dx\right] \quad (11b)$$

In these formulas, $\varepsilon_0$ is the electric permittivity of vacuum, $\omega$ is the angular frequency of the light, $P_1$ ($P_2$) is a normalization constant which represents the unit of power in the isolated slab 1 (slab 2). $\vec{E}_1$ and $\vec{E}_2$ are the electric field vectors of slab 1 and slab 2, respectively. Note that $k_{12} \neq k_{21}$ for dissimilar waveguides. In self-consistent orthogonal coupled mode theory, the coupling coefficient k takes the average of $k_{12}$ and $k_{21}$:

$$k = \frac{k_{12}+k_{21}}{2}. \quad (12)$$

For a general five-layer slab, shown in FIG. 5C, Eq. (11) is straightforward, even though tedious, and results in the following expressions for the coupling coefficients (Eqs. (13a) and (13b), below)

$$k_{12} = \sqrt{\frac{\beta_1\beta_2}{Q_1Q_2}}\frac{\gamma_{x32}e^{-\gamma_{x32}d_3}}{k_{x2}^2+(\gamma_{x32})^2}\frac{(n_2^2-n_3^2)n_4}{n_2 n_3^2}\frac{1}{\sqrt{1+\left(\frac{n_4^2}{n_3^2}\frac{\gamma_{x32}}{k_{x4}}\right)^2}}$$

$$\left\{\frac{1}{\sqrt{1+\left(\frac{n_2^2}{n_3^2}\frac{\gamma_{x31}}{k_{x2}}\right)^2}}\left[1+\frac{n_2^2}{n_3^2}\frac{\gamma_{x31}}{\gamma_{x32}}+\frac{k_{x2}^2}{\beta_1\beta_2}-\frac{n_2^2}{n_3^2}\frac{\gamma_{x31}\gamma_{x32}}{\beta_1\beta_2}\right]-\right.$$

$$\frac{e^{-\gamma_{x32}d_2}}{\sqrt{1+\left(\frac{n_2^2}{n_1^2}\frac{\gamma_{x1}}{k_{x2}}\right)^2}}\left[$$

$$\left.1-\frac{n_2^2}{n_1^2}\frac{\gamma_{x1}}{k_{x32}}+\frac{k_{x2}^2}{\beta_1\beta_2}+\frac{n_2^2}{n_1^2}\frac{\gamma_{x1}\gamma_{x32}}{\beta_1\beta_2}\right]\right\}+$$

$$\sqrt{\frac{\beta_1\beta_2}{Q_1Q_2}}\frac{1+\frac{\gamma_{x1}\gamma_{x32}}{\beta_1\beta_2}}{\gamma_{x1}+\gamma_{x32}}e^{-\gamma_{x32}(d_3+d_2)}\frac{(n_1^2-n_3^2)n_2n_4}{n_1^2n_3^2}$$

$$\frac{1}{\sqrt{1+\left(\frac{n_2^2}{n_1^2}\frac{\gamma_{x1}}{k_{x2}}\right)^2}}\frac{1}{\sqrt{1+\left(\frac{n_4^2}{n_3^2}\frac{\gamma_{x32}}{k_{x4}}\right)^2}}$$

$$k_{21}=\sqrt{\frac{\beta_1\beta_2}{Q_1Q_2}}\frac{\gamma_{x31}e^{-\gamma_{x31}d_3}}{k_{x4}^2+(\gamma_{x31})^2}\frac{(n_4^2-n_3^2)n_2}{n_4n_3^2}\frac{1}{\sqrt{1+\left(\frac{n_2^2}{n_3^2}\frac{\gamma_{x31}}{k_{x2}}\right)^2}}$$

$$\left\{\frac{1}{\sqrt{1+\left(\frac{n_4^2}{n_3^2}\frac{\gamma_{x32}}{k_{x4}}\right)^2}}\left[1+\frac{n_4^2}{n_3^2}\frac{\gamma_{x32}}{\gamma_{x31}}+\frac{k_{x4}^2}{\beta_1\beta_2}-\frac{n_4^2}{n_3^2}\frac{\gamma_{x31}\gamma_{x32}}{\beta_1\beta_2}\right]-\right.$$

$$\frac{e^{-\gamma_{x31}d_4}}{\sqrt{1+\left(\frac{n_4^2}{n_5^2}\frac{\gamma_{x5}}{k_{x4}}\right)^2}}\left[$$

$$\left.1-\frac{n_4^2}{n_5^2}\frac{\gamma_{x5}}{\gamma_{x31}}+\frac{k_{x4}^2}{\beta_1\beta_2}+\frac{n_4^2}{n_5^2}\frac{\gamma_{x5}\gamma_{x31}}{\beta_1\beta_2}\right]\right\}+$$

$$\sqrt{\frac{\beta_1\beta_2}{Q_1Q_2}}\frac{1+\frac{\gamma_{x5}\gamma_{x31}}{\beta_1\beta_2}}{\gamma_{x5}+\gamma_{x31}}e^{-\gamma_{x31}(d_3+d_4)}\frac{(n_5^2-n_3^2)n_2n_4}{n_5^2n_3^2}$$

$$\frac{1}{\sqrt{1+\left(\frac{n_2^2}{n_3^2}\frac{\gamma_{x31}}{k_{x2}}\right)^2}}\frac{1}{\sqrt{1+\left(\frac{n_4^2}{n_5^2}\frac{\gamma_{x5}}{k_{x4}}\right)^2}}$$

with $$Q_1 = d_2+\frac{k_0^2(n_2n_1)^2(n_2^2-n_1^2)}{[(n_1^2k_{x2})^2+(n_2^2\gamma_{x1})^2]\gamma_{x1}}+\frac{k_0^2(n_2n_3)^2(n_2^2-n_3^2)}{[(n_3^2k_{x2})^2+(n_2^2\gamma_{x31})^2]\gamma_{x31}} \quad (13c)$$

$$Q_2 = d_4+\frac{k_0^2(n_4n_5)^2(n_4^2-n_5^2)}{[(n_5^2k_{x4})^2+(n_4^2\gamma_{x5})^2]\gamma_{x5}}+\frac{k_0^2(n_4n_3)^2(n_4^2-n_3^2)}{[(n_3^2k_{x4})^2+(n_4^2\gamma_{x32})^2]\gamma_{x32}} \quad (13d)$$

and $$k_{x2}^2 = (k_0n_2)^2-\beta_1^2 \quad (14a)$$

$$k_{x4}^2 = (k_0n_4)^2-\beta_2^2 \quad (14b)$$

$$\gamma_{x1}^2 = \beta_1^2-(k_0n_1)^2 \quad (14c)$$

$$\gamma_{x31}^2 = \beta_1^2-(k_0n_3)^2 \quad (14d)$$

$$\gamma_{x5}^2 = \beta_2^2-(k_0n_5)^2 \quad (14e)$$

$$\gamma_{x32}^2 = \beta_2^2-(k_0n_3)^2 \quad (14f)$$

To achieve low normal mode conversion, the term in the first bracket in Eq. (10) is decreased, by tapering the branch waveguide from wide start to narrow end, as shown in FIG. 4 and also in FIG. 2. As an example, a waveguide (e.g., branch waveguide 230 of FIG. 2) has a 120-nm thick TiOx core of refractive index $n_c$=2.36 with silica clading ($n_t$=1.46). An assistant layer is SiONx, 700-nm thick, with a refractive index $n_a$=1.70. The light source (e.g., light source 204 of FIG. 2) is an edge-emitting laser diode, TE polarized, emission wavelength λ=830 nm. The diode's slow-axis is parallel to the waveguide plane and $TE_{00}$ mode will be excited in the waveguide input coupler. The waveguide input coupler (e.g., waveguide input coupler 220 of FIG. 2) is 170 nm wide at the start (e.g., $W_{11}$ at distal end 222) and becomes wider linearly toward its end (e.g., $W_{12}$ at proximal end 224). The end width (e.g., $W_{12}$ at proximal end 224) is optimized for both efficiency and mode order conversion. The propagation length from the start of waveguide input coupler (e.g., distal end 222 of waveguide input coupler 220) to the end of the converter (e.g., to proximal end 224) is 120 μm.

Returning to FIG. 4, as indicated above, branch waveguide 400 has a middle line M that follows a cosine-like shape:

$$x = \text{offset}\left[1-\cos^m\left(\pi\frac{z}{2L}\right)\right], \quad (15)$$

where branch offset O and L are shown in FIG. 4, and m is a parameter controlling the slope of the shape. When m=2 it yields a cosine shape and when m<2 it gives a more smooth change near the converter end, proximal end 404.

The term in the first bracket of Eq. (10) is a function of propagation length for the branch waveguide start width (i.e., $W_1$ in FIG. 4). This term is significantly reduced with increasing branch start width. Near distal end 402, the term is nearly zero for all cases, since X is very large; at the end of converter (i.e., at proximal end 404) the term is equal for start widths, because the branch waveguide proximal end width is as wide as the waveguide input coupler proximal end width, so X=0.

With the contribution of the term in the second bracket in Eq. (10), i.e., $$-\frac{dX}{dz},$$

Eq. (16) is found $$\frac{dX}{dZ} = \frac{1}{2k}\frac{d(\beta_1-\beta_2)}{dz}-\frac{(\beta_1-\beta_2)}{2k^2}\frac{dk}{dz} \quad (16)$$

In Eq. (16), the first term comes from tapering in phase velocity, $$\frac{d(\beta_1 - \beta_2)}{dz},$$

and the second term results from tapering in coupling between two waveguides, $$\frac{dk}{dz}.$$

The two terms may not be canceled, due to $$\frac{d(\beta_1 - \beta_2)}{dz} \leq 0 \text{ and } \frac{dk}{dz} \geq 0.$$

To see how $$\frac{dX}{dZ}$$

is related to the change in waveguide widths and their separation, the effective-index method is used to obtain the following equations:

$$\frac{d\beta_1}{d(d_2)} = \frac{(k_{x2})^2}{\beta_1} \frac{1}{Q_1} \tag{17a}$$

$$\frac{d\beta_2}{d(d_4)} = \frac{(k_{x4})^2}{\beta_2} \frac{1}{Q_2} \tag{17b}$$

$$\frac{d(\ln k_{12})}{dz} = c_{11} \frac{d(d_2)}{dz} + c_{12} \frac{d(d_3)}{dz} + c_{13} \frac{d(d_4)}{dz} \tag{17c}$$

$$\frac{d(\ln k_{21})}{dz} = c_{21} \frac{d(d_2)}{dz} + c_{22} \frac{d(d_3)}{dz} + c_{23} \frac{d(d_4)}{dz} \tag{17d}$$

$$c_{11} = -\frac{1}{2Q_1} - \tag{17e}$$
$$\frac{k_{x2}^2}{Q_1}\left\{\frac{1}{k_{x2}^2} - \frac{1}{2\beta_1^2} - \frac{(n_3^4 - n_2^4)}{(n_3^2 k_{x2})^2 + (n_2^2 \gamma_{x31})^2} - \frac{2}{k_{x2}^2 + \gamma_{x32}^2}\right\} + \frac{k_{x2}^2}{2Q_1^2}$$
$$\left\{\frac{(n_1 n_2)^2 k_0^2 (n_2^2 - n_1^2)}{(n_1^2 k_{x2})^2 + (n_2^2 \gamma_{x1})^2} \frac{1}{\gamma_{x1}} \left[\frac{1}{\gamma_{x1}^2} - \frac{2(n_1^4 - n_2^4)}{(n_1^2 k_{x2})^2 + (n_2^2 \gamma_{x1})^2}\right] + \right.$$
$$\left. \frac{(n_2 n_3)^2 k_0^2 (n_2^2 - n_3^2)}{(n_3^2 k_{x2})^2 + (n_2^2 \gamma_{x31})^2} \frac{1}{\gamma_{x31}} \left[\frac{1}{\gamma_{x31}^2} - \frac{2(n_3^4 - n_2^4)}{(n_3^2 k_{x2})^2 + (n_2^2 \gamma_{x31})^2}\right]\right\} -$$
$$\frac{k_{x2}^2}{Q_1 Q_3}\left[-\left(\frac{n_2}{n_3}\right)^2 \frac{1}{\gamma_{x31}\gamma_{x32}} + \frac{1}{\beta_1 \beta_2} \frac{k_{x2}^2 - (n_2/n_3)^2 \gamma_{x31}\gamma_{x32}}{\beta_1^2} + \frac{2}{\beta_1 \beta_2}\left(1 + \frac{n_2^2}{2n_3^2}\frac{\gamma_{x32}}{\gamma_{x31}}\right)\right]$$

$$c_{12} = -\gamma_{x32} \tag{17f}$$

$$c_{13} = -\frac{1}{2Q_2} - \frac{k_{x4}^2}{Q_2}\left\{\frac{\frac{1}{k_{x4}^2} - \frac{1}{\gamma_{x32}^2} + \frac{d_3}{\gamma_{x32}} - \frac{1}{2\beta_2^2} -}{\frac{(n_3^4 - n_4^4)}{(n_3^2 k_{x4})^2 + (n_4^2 \gamma_{x32})^2} + \frac{2}{k_{x2}^2 + \gamma_{x32}^2}}\right\} + \frac{k_{x4}^2}{2Q_2^2} \tag{17g}$$
$$\left\{\frac{(n_4 n_5)^2 k_0^2 (n_4^2 - n_5^2)}{(n_5^2 k_{x4})^2 + (n_4^2 \gamma_{x5})^2} \frac{1}{\gamma_{x5}} \left[\frac{1}{\gamma_{x5}^2} - \frac{2(n_5^4 - n_4^4)}{(n_5^2 k_{x4})^2 + (n_4^2 \gamma_{x5})^2}\right] + \right.$$
$$\left. \frac{(n_4 n_3)^2 k_0^2 (n_4^2 - n_3^2)}{(n_3^2 k_{x4})^2 + (n_4^2 \gamma_{x32})^2} \frac{1}{\gamma_{x32}} \left[\frac{1}{\gamma_{x32}^2} - \frac{2(n_3^4 - n_4^4)}{(n_3^2 k_{x4})^2 + (n_4^2 \gamma_{x32})^2}\right]\right\} -$$
$$\frac{k_{x4}^2}{Q_1 Q_3}\left[\left(\frac{n_2}{n_3}\right)^2 \frac{\gamma_{x31}}{\gamma_{x32}}\left(\frac{1}{\gamma_{x32}^2} + \frac{1}{\beta_1 \beta_2}\right) + \frac{1}{\beta_1 \beta_2}\frac{k_{x2}^2 - (n_2/n_3)^2 \gamma_{x31}\gamma_{x32}}{\beta_2^2}\right]$$

$$c_{21} = -\frac{1}{2Q_1} - \frac{k_{x2}^2}{Q_1}\left\{\frac{\frac{1}{k_{x2}^2} - \frac{1}{\gamma_{x31}^2} + \frac{d_3}{\gamma_{x31}} - \frac{1}{2\beta_1^2} -}{\frac{n_3^4 - n_2^4}{(n_3^2 k_{x2})^2 + (n_2^2 \gamma_{x31})^2} + \frac{2}{k_{x4}^2 + \gamma_{x31}^2}}\right\} + \frac{k_{x2}^2}{2Q_1^2} \tag{17h}$$
$$\left\{\frac{(n_1 n_2)^2 k_0^2 (n_2^2 - n_1^2)}{(n_1^2 k_{x2})^2 + (n_2^2 \gamma_{x1})^2} \frac{1}{\gamma_{x1}} \left[\frac{1}{\gamma_{x1}^2} - \frac{2(n_1^4 - n_2^4)}{(n_1^2 k_{x2})^2 + (n_2^2 \gamma_{x1})^2}\right] + \right.$$
$$\left. \frac{(n_2 n_3)^2 k_0^2 (n_2^2 - n_3^2)}{(n_3^2 k_{x2})^2 + (n_2^2 \gamma_{x31})^2} \frac{1}{\gamma_{x31}} \left[\frac{1}{\gamma_{x31}^2} - \frac{2(n_3^4 - n_2^4)}{(n_3^2 k_{x2})^2 + (n_2^2 \gamma_{x31})^2}\right]\right\} -$$
$$\frac{k_{x2}^2}{Q_1 Q_4}\left[\left(\frac{n_4}{n_3}\right)^2 \frac{\gamma_{x32}}{\gamma_{x31}}\left(\frac{1}{\gamma_{x31}^2} + \frac{1}{\beta_1 \beta_2}\right) + \frac{1}{\beta_1 \beta_2}\frac{k_{x4}^2 - (n_4/n_3)^2 \gamma_{x31}\gamma_{x32}}{\beta_1^2}\right]$$

$$c_{22} = -\gamma_{x31} \tag{17i}$$

$$c_{23} = -\frac{1}{2Q_2} - \tag{17j}$$
$$\frac{k_{x4}^2}{Q_2}\left\{\frac{1}{k_{x4}^2} - \frac{1}{2\beta_2^2} - \frac{(n_3^4 - n_4^4)}{(n_3^2 k_{x4})^2 + (n_4^2 \gamma_{x32})^2} - \frac{2}{k_{x4}^2 + \gamma_{x31}^2}\right\} + \frac{k_{x4}^2}{2Q_2^2}$$
$$\left\{\frac{(n_4 n_5)^2 k_0^2 (n_4^2 - n_5^2)}{(n_5^2 k_{x4})^2 + (n_4^2 \gamma_{x5})^2} \frac{1}{\gamma_{x5}} \left[\frac{1}{\gamma_{x5}^2} - \frac{2(n_5^4 - n_4^4)}{(n_5^2 k_{x4})^2 + (n_4^2 \gamma_{x5})^2}\right] + \right.$$
$$\left. \frac{(n_4 n_3)^2 k_0^2 (n_4^2 - n_3^2)}{(n_3^2 k_{x4})^2 + (n_4^2 \gamma_{x32})^2} \frac{1}{\gamma_{x32}} \left[\frac{1}{\gamma_{x32}^2} - \frac{2(n_3^4 - n_4^4)}{(n_3^2 k_{x4})^2 + (n_4^2 \gamma_{x32})^2}\right]\right\} -$$
$$\frac{k_{x4}^2}{Q_2 Q_4}\left[-\left(\frac{n_4}{n_3}\right)^2 \frac{1}{\gamma_{x31}\gamma_{x32}} + \frac{1}{\beta_1 \beta_2}\frac{k_{x4}^2 - (n_4/n_3)^2 \gamma_{x31}\gamma_{x32}}{\beta_2^2} + \frac{2}{\beta_1 \beta_2}\left(1 + \frac{n_4^2}{2n_3^2}\frac{\gamma_{x31}}{\gamma_{x32}}\right)\right]$$

$$Q_3 = 1 + \left(\frac{n_2}{n_3}\right)^2 \frac{\gamma_{x31}}{\gamma_{x32}} + \frac{(k_{x2})^2}{\beta_1 \beta_2} - \left(\frac{n_2}{n_3}\right)^2 \frac{\gamma_{x31}\gamma_{x32}}{\beta_1 \beta_2} \tag{17k}$$

$$Q_4 = 1 + \left(\frac{n_4}{n_3}\right)^2 \frac{\gamma_{x32}}{\gamma_{x31}} + \frac{(k_{x4})^2}{\beta_1 \beta_2} - \left(\frac{n_4}{n_3}\right)^2 \frac{\gamma_{x31}\gamma_{x32}}{\beta_1 \beta_2}. \tag{17l}$$

Substituting Eq. (16) with Eqs. (17), obtains $$\frac{dX}{dz} = \frac{1}{2k} \left[ \left( \frac{k_{x2}^2}{\beta_1 Q_1} - \frac{\Delta\beta}{k} \frac{k_{12}c_{11} + k_{21}c_{21}}{2} \right) \frac{d(d_2)}{dz} - \frac{\Delta\beta}{k} \frac{k_{12}c_{12} + k_{21}c_{22}}{2} \frac{d(d_3)}{dz} - \left( \frac{k_{x4}^2}{\beta_2 Q_2} + \frac{\Delta\beta}{k} \frac{k_{12}c_{13} + k_{21}c_{23}}{2} \right) \frac{d(d_4)}{dz} \right] \quad (18)$$

In Eq. (18), the first term in the bracket results from the tapering in the branch waveguide, $$\frac{d(d_2)}{dz},$$

but its contribution to $$\frac{dX}{dz}$$

is small, due to the cancellation of two terms in its coefficient. The second term in the bracket comes from tapering in the coupling between the two waveguides, $$\frac{d(d_3)}{dz},$$

due to the change in separation between the two waveguides, and the third term from the tapering in the waveguide input coupler, $$\frac{d(d_4)}{dz}.$$

The last two terms will be canceled to some extent. The waveguide input coupler is usually designed to have efficient coupling from the light source and there is not much freedom available to modify the design of the converter. Eventually, the contribution of tapering in coupling to $$\frac{dX}{dz}$$

is dominant.

The optimal branch tapering is a compromise of its effect to the term in the first bracket in Eq. (10), the term in the second bracket of Eq. (10), and the exponential phase term in Eq. (5). More tapering in the branch waveguide width causes more rapid change in the coupling coefficient k between the two waveguides and therefore, lead to larger $$\frac{dX}{dz}.$$

The magnitude of $$\frac{dX}{dz} \times 2k$$

increases with increased tapering. The effect of branch tapering affects the term in the first bracket of Eq. (10) and the term in the second bracket of Eq. (10) differently: the increase in $$\frac{dX}{dz} \times 2k$$

is mainly near the start of the converter, where the term in the first bracket is nearly zero. From Eq. (10), $|a_s(z)|_{max}$ is a function of z, and confirms that tapering the branch waveguide reduces normal mode conversion.

Figure 6:
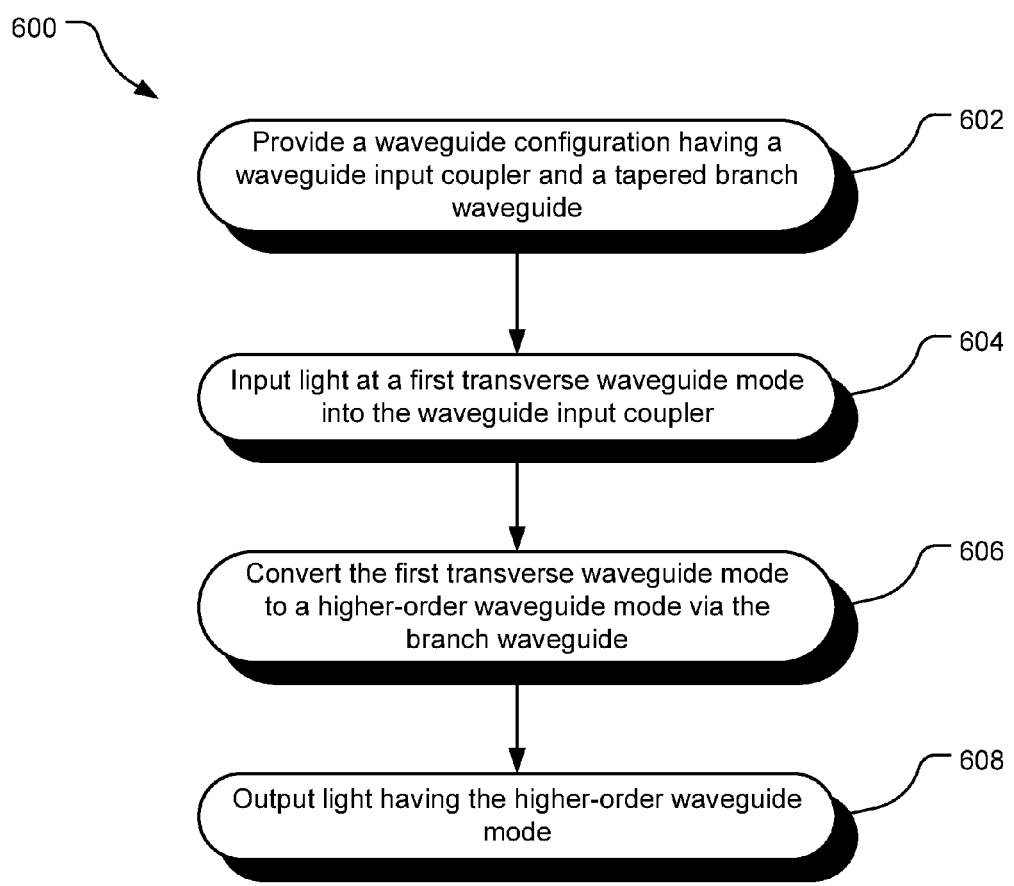
FIG. 6 is a is a flow chart of example operations for converting light from a first order waveguide mode to a higher-order waveguide mode.

An implementation for using a waveguide configuration having a tapered branch waveguide is illustrated in FIG. 6. A process 600 includes a first operation 602 that provides a waveguide configuration having a waveguide input coupler and a tapered branch waveguide. Light is inputted into the waveguide input coupler at a fundamental waveguide mode (e.g., $TE_{00}$ or $TM_{00}$) at an operation 604. At an operation 606, the first transverse waveguide mode is converted to a higher-order waveguide mode (e.g., $TE_{10}$ or $TM_{10}$) by the branch waveguide. At an operation 608, the light having the higher-order waveguide mode is outputted.

In summary, this disclosure provides a light delivery system comprising a waveguide configuration that includes a waveguide input coupler that couples light from a base or normal waveguide mode to a higher-order waveguide mode. The waveguide configuration includes a branched waveguide that converts the excited fundamental waveguide mode (e.g., $TE_{00}$ or $TM_{00}$) in the input coupler into the higher-order mode (e.g., $TE_{10}$ or $TM_{10}$). The branch waveguide tapers from wide at its start to narrow at its end, and in some implementations the branch waveguide width at its end is nearly equal to or equal to that of the waveguide input coupler, to prevent the excitation of $TE_{00}$ in the joined waveguide. In some implementations, the waveguide input coupler is optimized for coupling efficiency from the light source with an inverse taper. The joined waveguide width (e.g., the waveguide adaptor) can be designed to allow only two modes (e.g., $TE_{00}$ and $TE_{10}$ or, e.g., $TM_{00}$ and $TM_{10}$) and may be optimized to maximize the mode field overlap between the higher-order mode (e.g., $TE_{10}$ or $TM_{10}$ mode) of the joined waveguide and the odd normal mode at the end of the coupled waveguides.

The above specification, examples, and data provide a complete description of the structure, features and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. An apparatus comprising:
   a waveguide input coupler including a distal end having a distal end width and a proximal end having a proximal end width;
   a tapered branch waveguide including a distal end having a distal end width and a proximal end having a proximal end width, the branch waveguide distal end width being greater than the branch waveguide proximal end width; and
   a waveguide adaptor physically connected to the waveguide input coupler proximal end and to the branch waveguide proximal end;
   the waveguide input coupler, the branch waveguide, and the waveguide adapter being configured to convert input light having a base transverse waveguide mode to output light having a higher-order waveguide mode.

2. The apparatus of claim 1 wherein the branch waveguide has an arcuate middle line.

3. The apparatus of claim 2 wherein the branch waveguide has a middle line defined by a cosine or cosine-like curve.

4. The apparatus of claim 1 wherein the branch waveguide is linearly tapered from the branch waveguide distal end to the branch waveguide proximal end.

5. The apparatus of claim 1 wherein the waveguide input coupler proximal end width is substantially equal to the branch waveguide proximal end width where each proximal end is connected to the waveguide adapter.

6. The apparatus of claim 1 wherein the waveguide input coupler and the branch waveguide have a gap therebetween from each of the distal ends to each of the proximal ends.

7. The apparatus of claim 1 wherein the waveguide input coupler and the branch waveguide have a gap therebetween where each proximal end is connected to the waveguide adapter.

8. The apparatus of claim 1 wherein the waveguide input coupler distal end width is less than the waveguide input coupler proximal end width where the proximal end is connected to the waveguide input adapter.

9. The apparatus of claim 1 further comprising a solid immersion mirror configured to focus the higher-order transvers waveguide mode light output from the waveguide adapter to a target.

10. The apparatus of claim 1 wherein the waveguide adapter is configured to direct the higher-order transverse waveguide mode light output from the waveguide input coupler and the branch waveguide to a target.

11. The apparatus of claim 1 wherein:
   the waveguide input coupler distal end width is less than the waveguide input coupler proximal end width;
   the middle line of the tapered branch waveguide is defined by a cosine or cosine-like curve; and
   the waveguide input coupler proximal end width is the same as the branch waveguide proximal end width.

12. The apparatus of claim 1 wherein the waveguide input coupler, the branch waveguide, and the waveguide adapter are configured to convert input light having a transverse electric (TE) or transverse magnetic (TM) waveguide mode of $TE_{00}$ or $TM_{00}$ to output light having a higher-order TE or TM waveguide mode.

13. An apparatus comprising:
   a waveguide input coupler including a proximal end having a proximal end width, the waveguide input coupler configured to receive light having a first transverse waveguide mode;
   a branch waveguide including a distal end having a distal end width and a proximal end having a proximal end width, the branch waveguide distal end width being greater than the branch waveguide proximal end width; and
   a waveguide adaptor operably connected to the waveguide input coupler proximal end and to the branch waveguide proximal end, wherein the waveguide input coupler, the branch waveguide, and the waveguide adapter are configured to prevent excitation of the light at the first waveguide mode.

14. The apparatus of claim 13 wherein the waveguide input coupler, the branch waveguide, and the waveguide adapter are further configured to allow excitation of the light at a higher-order waveguide mode.

15. The apparatus of claim 14 further comprising a light source and a plasmonic transducer, wherein the waveguide adapter is configured to direct the higher-order waveguide mode light to the target.

16. The apparatus of claim 13 wherein the waveguide adaptor has an input width nearly equal to or greater than a sum of the waveguide input coupler proximal end width and the branch waveguide proximal end width.

17. The apparatus of claim 13, the waveguide input coupler further having a distal end including a distal end width, and wherein the waveguide input coupler distal end width is less than the waveguide input coupler proximal end width.

18. The apparatus of claim 13, wherein the waveguide input coupler is configured to receive light having a first transverse electric (TE) or transverse magnetic (TM) waveguide mode.

19. A method comprising:
   coupling light having a first transverse waveguide mode into a waveguide input coupler;
   converting the light having the first waveguide mode into light having a higher-order waveguide mode via the waveguide input coupler and a tapered branch waveguide physically spaced from the waveguide input coupler; and
   outputting the light having the higher-order waveguide mode from a waveguide adapter connected to the waveguide input coupler and to the tapered branch waveguide.

20. The method of claim 19 wherein the first transverse waveguide mode is $TE_{00}$ and the higher-order TE mode is $TE_{10}$.

21. The method of claim 19 wherein the first transverse waveguide mode is $TM_{00}$ and the higher-order TM mode is $TM_{10}$.

22. The method of claim 19 further comprising:
   impinging the output higher-order mode light on a target.

23. The method of claim 22 wherein the target is a plasmonic transducer.

* * * * *